Sept. 18, 1923.
J. A. HOLIFIELD
1,468,154
SELF REGULATING MOTOR GENERATOR SET FOR ARC WELDING
Original Filed May 9, 1921
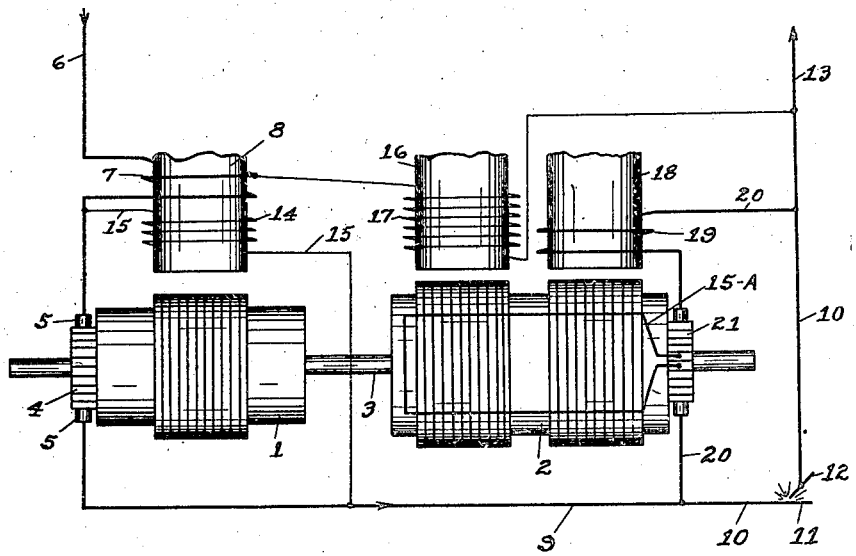
INVENTOR
J.A. Holifield.
BY
ATTORNEY Patented Sept. 18, 1923.

1,468,154

UNITED STATES PATENT OFFICE.

JOSEPH A. HOLIFIELD, OF MOBILE, ALABAMA, ASSIGNOR TO WHITE FUEL OIL ENGINEERING CORPORATION, OF NEW YORK, N. Y., A CORPORATION OF NEW YORK.

SELF-REGULATING MOTOR-GENERATOR SET FOR ARC WELDING.

Application filed May 9, 1921, Serial No. 467,846. Renewed June 29, 1923.

*To all whom it may concern:*

Be it known that I, JOSEPH A. HOLIFIELD, a citizen of the United States of America, residing at Mobile, in the county of Mobile and State of Alabama, have invented certain new and useful Improvements in Self-Regulating Motor-Generator Sets for Arc Welding, of which the following is a specification.

This invention relates to an arc welding apparatus and has for its object more particularly to utilize a self-regulating motor generator set for the production of the arc welding current.

Where motor generator sets have been heretofore used in this art they have been necessarily connected across constant potential service mains and the regulating function of the motor generator set is the result of the control of the magnetic intensity of the generator armature fields, assuming the motor to have a constant speed. The objection to obtaining the regulating function solely by the control of the magnetic intensity of a differentially wound dynamo field results from the fact that such field has a transformer effect which, acting like inertia in a mechanical construction, will cause a lag in the current changes which will make the arc unstable. The practice heretofore has been to remedy this instability of the current by the use of a stabilizer, usually a reaction coil interposed in the welding circuit and without this it has proven impractical as a welding apparatus. The natural result of the interposition of the reaction coil in the arc welding circuit is to cause an unnecessary loss or wastage of current, and moreover it adds considerable expense and weight to the apparatus.

It is the prime object of my invention to avoid these objections to the utilization of a motor generator outfit for arc welding and to this end I have so designed the generator that no reaction coil is required in the arc welding circuit to avoid fluctuations therein or to stabilize the arc, and at the same time I avoid the troubles resulting from the induction action in the generator fields by providing the latter with independent twin fields in which the requisite variations of magnetic intensity can take place without induction effect, due to the fact that the regulating function is obtained by the control of the generation of current in the armature and not by a variation in the sum of the magnetic intensity of one set of fields. By thus transforming the regulating function from the fields to the armature, I avoid the lag or current inertia and hold the regulating function of the apparatus always in direct and close response to the variations in resistance in the arc and enable the regulating functions to follow the latter so quickly and instantaneously that there is no necessity for a reaction coil or equivalent element in the apparatus.

In a companion application, Serial No. 454,277, filed the 21st day of March, 1921, I have claimed broadly the utilization of a current generator having twin parallel fields which exert independent magnetic influence upon common armature windings so that the resulting current output represents the sum of the magnetic influence of the two fields. I have sought herein to so combine such a generator in a motor generator set that I am enabled to produce a generating apparatus peculiarly adapted for constant potential direct current service and which can be manufactured at a relatively low cost and which is light, compact and portable.

The novel features of my invention are set out more particularly in the appended claims, and a typical embodiment thereof, which can be readily understood by those skilled in the art, is shown in the accompanying drawings, in which I show a motor armature 1 and a generator armature 2 mounted upon a common shaft 3, the motor having a commutator 4, the brushes 5 of which derive a constant potential D. C. current from the main line 6 in a circuit which includes a series winding 7 about the field poles 8 of the motor. The current flows from the brushes 5 along a conductor 9 to the arcing circuit 10 which includes the electrodes 11 and 12 which are manually controlled to strike and form the arc. The current from the arc circuit returns by a conductor 13 to the main line. The motor field comprises a small collective winding 14 in a branch circuit 15 across the motor brushes.

The generator armature 2 is wound in any ordinary manner, a coil 15ª being typically shown. The generator is provided with independent twin sets of fields so disposed as to exert their magnetic influence at the same time on the same armature coil 15ª. One field comprises the pole pieces 16 having a constantly excited field winding 17 in shunt across the main line, whereas the other field comprises pole pieces 18 having field windings 19 in series with the brushes 20 of the generator commutator 21, which brushes are connected in series with the arc circuit 10. The field windings 17 and 19 are of such character that the winding 17, having substantially constant magnetic intensity, will at all times predominate and the pole pieces 16 and 18 will have opposite polarity. As a result of this arrangement the joint influence of the twin fields on the same armature winding, exerted at different points thereon, is to cause said winding to generate current in proportion to the sum of the difference of the magnetic intensity of the two fields. Thus, assuming that the field 17, under short circuit conditions at the arc, will be capable of inducing a low voltage current, on striking the arc the resistance in the arc will reduce the magnetic intensity of the field 19, causing the field 17 to further predominate up to conditions in which the field 17 has its maximum predominance. As the predominance thus increases the voltage of the generated current is proportionately increased.

As the resistance at the arc increases, the voltage across the motor armature decreases, thereby reducing its breaking action and allowing more current to flow, so that the sum of the generator current and the current passing through the motor will collectively maintain a substantially constant current of voltage at the arc.

Having thus described my invention, what I claim as new and desire to secure by Letters Patent, is:—

1. An arc welding apparatus comprising a welding circuit having welding electrodes therein, a source of constant potential current connected to said circuit, and an automatic regulating means for the current delivered to the welding circuit comprising a motor generator set adapted to deliver a current of substantially constant wattage at the arc within normal limits, said set comprising a shunt wound motor with its series field winding in series with the arc circuit, and a generator having twin sets of fields, one set of field windings constantly energized by said source of current and the other set being differentially and variably energized by a circuit connected in series with the generator armature and across the welding circuit.

2. An electric welding apparatus comprising a welding circuit including welding electrodes, a source of constant potential current, a generator comprising an armature connected in series with the welding circuit and having twin parallel sets of fields, one separately excited by said constant potential current and the other differentially excited by the generator current, a motor for driving the generator, the armatures of the motor and generator being connected in series across said source of current, a series field winding and a shunt field winding for the motor, the said shunt winding being connected across the motor armature and said series winding being connected accumulatively with respect to said shunt winding, and the said welding circuit being connected in series with the series fields of the generator and motor.

In testimony whereof I affix my signature.

JOSEPH A. HOLIFIELD

Witness:
  NOMIE WELSH.